United States Patent
Kobuse

(10) Patent No.: US 10,129,449 B2
(45) Date of Patent: Nov. 13, 2018

(54) FLASH BAND, DETERMINATION DEVICE FOR DETECTING FLASH BAND, METHOD OF CONTROLLING THE SAME, STORAGE MEDIUM, AND IMAGE PICKUP APPARATUS

(71) Applicant: CANON KABUSHIKI KAISHA, Tokyo (JP)

(72) Inventor: Takenori Kobuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/457,496

(22) Filed: Mar. 13, 2017

(65) Prior Publication Data

US 2017/0272629 A1    Sep. 21, 2017

(30) Foreign Application Priority Data

Mar. 16, 2016 (JP) ................................ 2016-052246

(51) Int. Cl.
*H04N 5/225* (2006.01)
*H04N 5/232* (2006.01)
*G06T 7/90* (2017.01)

(52) U.S. Cl.
CPC ............. *H04N 5/2256* (2013.01); *G06T 7/90* (2017.01); *H04N 5/23248* (2013.01)

(58) Field of Classification Search
CPC ..... H04N 5/2256; H04N 5/23248; G06T 7/90
See application file for complete search history.

(56) References Cited

U.S. PATENT DOCUMENTS

| 9,113,092 | B2* | 8/2015 | Fukui | H04N 5/2357 |
| 2012/0188403 | A1* | 7/2012 | Gomita | H04N 5/2351 |
| | | | | 348/226.1 |
| 2013/0208149 | A1* | 8/2013 | Kamiya | H04N 5/217 |
| | | | | 348/241 |
| 2014/0232908 | A1* | 8/2014 | Kishida | H04N 5/2173 |
| | | | | 348/241 |
| 2015/0229818 | A1* | 8/2015 | Fukuyama | G06K 9/00228 |
| | | | | 348/367 |
| 2016/0373671 | A1* | 12/2016 | Yamashita | H04N 5/3572 |
| 2017/0366719 | A1* | 12/2017 | Kubota | H04N 5/235 |

FOREIGN PATENT DOCUMENTS

JP    2009-253367 A    10/2009

* cited by examiner

*Primary Examiner* — Shahbaz Nazrul
(74) *Attorney, Agent, or Firm* — Cowan, Liebowitz & Latman, P.C.

(57) ABSTRACT

A flash band determination device capable of always detecting a flash band with high accuracy, and correcting the detected flash band. It is determined whether or not there is a high-luminance area in an image, which is an area having a luminance level exceeding a predetermined luminance level. When determining whether or not a flash band which is an area having a luminance level higher than a predetermined threshold level is present in a difference image which is a difference between two images which are continuously obtained, if it is determined that the high-luminance area is present, whether or not the flash band is present is determined, by excluding an area corresponding to the high-luminance area, as a determination excluded area, from the difference image.

9 Claims, 12 Drawing Sheets

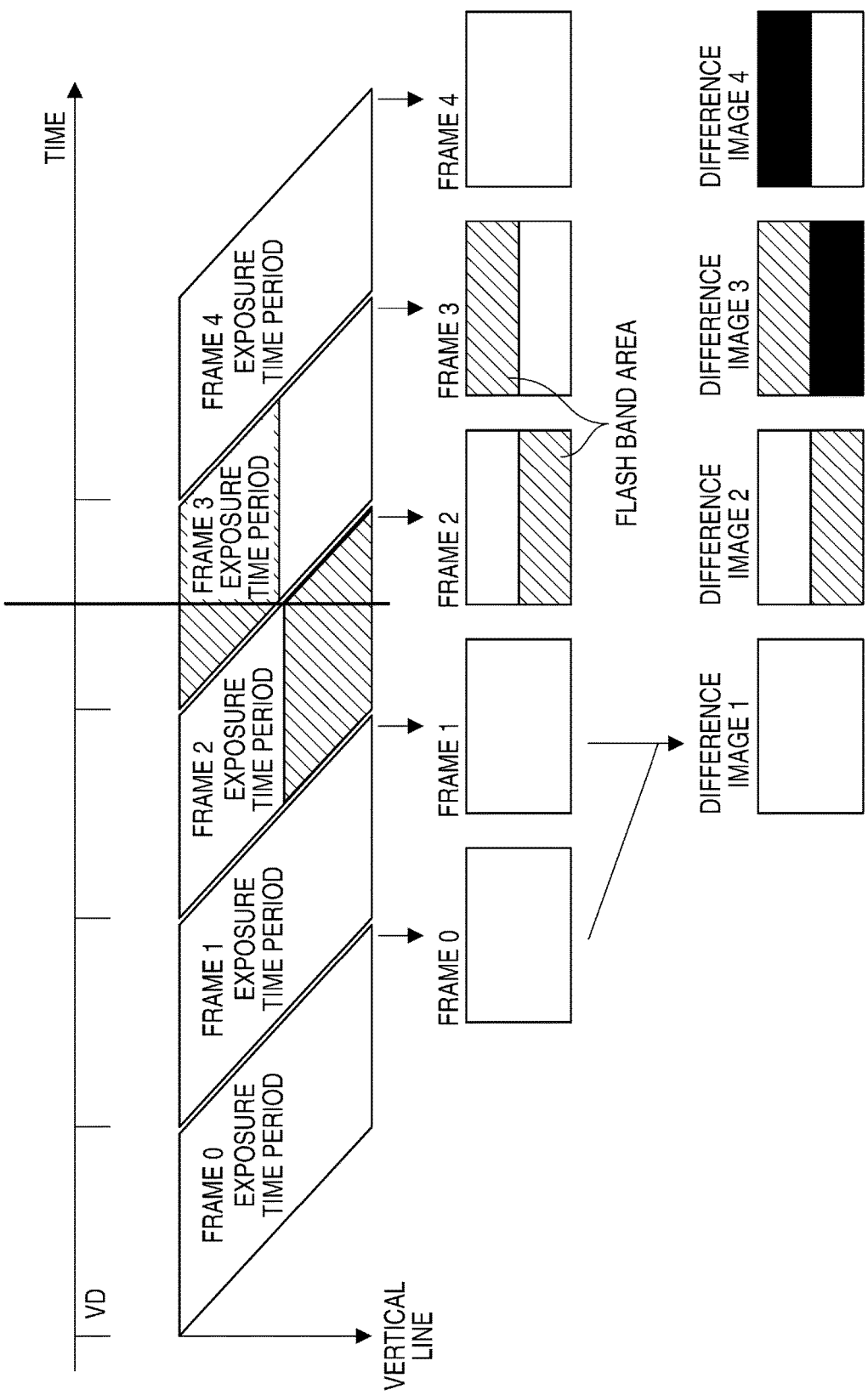

FLASH BAND, DETERMINATION DEVICE FOR DETECTING FLASH BAND, METHOD OF CONTROLLING THE SAME, STORAGE MEDIUM, AND IMAGE PICKUP APPARATUS

BACKGROUND OF THE INVENTION

Field of the Invention

The present invention relates to a flash band determination device, a method of controlling the same, a storage medium, and an image pickup apparatus, and more particularly to a flash band determination device that determines whether or not there is a flash band caused by an external flash of light in an image obtained through image pickup.

Description of the Related Art

In recent years, as an image pickup device used in an image pickup apparatus, such as a video camera, a CMOS image sensor (hereinafter referred to as the CMOS sensor) is used. In general, compared with a CCD image sensor (hereinafter referred to as the CCD sensor), the CMOS sensor is advantageous not only in that it is easy to manufacture, but also in that it consumes less power, and so forth. Further, there is also proposed a CMOS sensor increased in frame reading speed by increasing the number of read-out channels.

The CMOS sensor uses a so-called rolling shutter method in which horizontal lines are sequentially exposed, and video signals (image signals) are sequentially read out on a line-by-line basis to thereby generate one frame. In the CMOS sensor using the rolling shutter method, the exposure timing for each line and the read-out time for each line are out of synchronization. For this reason, if there is an external flash of light emitted in a very short emission time period, such as a so-called flash or a strobe light, there is generated, depending on a location on the screen, an image in which one frame is divided into an upper belt-like area and a lower belt-like area different in brightness, over two frames, in other words, there is generated an image in which a bright area caused by the external flash of light is split between two frames. Such a step of brightness between the belt-like areas caused by the external flash of light is referred to as the flash band.

On the other hand, in a case where the CCD sensor is used, the above-mentioned flash band is not generated, so that even when an external flash of light is used, it is possible to obtain an image which is uniformly bright throughout one frame and is free from a sense of strangeness. For such a reason as described above, an image pickup apparatus using the CMOS sensor is equipped with a correction function for correcting a flash band.

For example, there has been proposed an image pickup apparatus configured to detect a flash band so as to correct the same (see e.g. Japanese Laid-Open Patent Publication (Kokai) No. 2009-253367). In this image pickup apparatus, a change in luminance is calculated, and if the change in luminance corresponds to substantially one frame, it is determined that a flash band has occurred.

However, when performing determination of a flash band using the method described in Japanese Laid-Open Patent Publication (Kokai) No. 2009-253367, if there is an object which is constantly bright and extends horizontally, it is difficult to perform determination of a flash band.

SUMMARY OF THE INVENTION

The present invention provides a flash band determination device that is capable of always detecting a flash band with high accuracy and correcting the detected flash band, a method of controlling the same, a storage medium, and an image pickup apparatus.

In a first aspect of the invention, there is provided a flash band determination device that determines whether or not a flash band caused by an external flash of light is present in an image obtained through image pickup, comprising a first determination unit configured to determine whether or not a high-luminance area, which is an area having a luminance level exceeding a predetermined luminance level, is present in the image, and a second determination unit configured to determine, in a case where it is determined by the first determination unit that the high-luminance area is present when determining whether or not a flash band which is an area having a luminance level higher than a predetermined threshold level is present in a difference image which is a difference between two images which are continuously obtained, whether or not the flash band is present, by excluding an area corresponding to the high-luminance area, as a determination excluded area, from the difference image.

In a second aspect of the invention, there is provided an image pickup apparatus including an image pickup unit configured to sequentially read and output an image corresponding to an optical image formed via an optical lens, and a flash band determination device that determines whether or not a flash band caused by an external flash of light is present in an image obtained through image pickup, the flash band determination device comprising a first determination unit configured to determine whether or not a high-luminance area, which is an area having a luminance level exceeding a predetermined luminance level, is present in the image, and a second determination unit configured to determine, in a case where it is determined by the first determination unit that the high-luminance area is present when determining whether or not a flash band which is an area having a luminance level higher than a predetermined threshold level is present in a difference image which is a difference between two images which are continuously obtained, whether or not the flash band is present, by excluding an area corresponding to the high-luminance area, as a determination excluded area, from the difference image.

In a third aspect of the invention, there is provided a method of controlling a flash band determination device that determines whether or not a flash band caused by an external flash of light is present in an image obtained through image pickup, comprising determining whether or not a high-luminance area, which is an area having a luminance level exceeding a predetermined luminance level, is present in the image, and determining, in a case where it is determined that the high-luminance area is present when determining whether or not a flash band which is an area having a luminance level higher than a predetermined threshold level is present in a difference image which is a difference between two images which are continuously obtained, whether or not the flash band is present, by excluding an area corresponding to the high-luminance area, as a determination excluded area, from the difference image.

In a fourth aspect of the invention, there is provided a non-transitory computer-readable storage medium storing a computer-executable program for executing a method of controlling a flash band determination device that determines whether or not a flash band caused by an external flash of light is present in an image obtained through image pickup, wherein the method comprises determining whether or not a high-luminance area, which is an area having a luminance level exceeding a predetermined luminance level, is present in the image, and determining, in a case where it is determined that the high-luminance area is present when determining whether or not a flash band which is an area having a luminance level higher than a predetermined threshold level is present in a difference image which is a difference between two images which are continuously obtained, whether or not the flash band is present, by excluding an area corresponding to the high-luminance area, as a determination excluded area, from the difference image.

According to the present invention, it is possible to always detect a flash band with high accuracy, and as a result, it is possible to easily correct the detected flash band.

Further features of the present invention will become apparent from the following description of exemplary embodiments (with reference to the attached drawings).

BRIEF DESCRIPTION OF THE DRAWINGS

FIG. 2 is a diagram useful in explaining a relationship between exposure of an image pickup device appearing in FIG. 1 and output images.

FIGS. 6A to 6C are diagrams useful in explaining a line luminance detected when there is a high-luminance object portion, in which FIG. 6A shows a line luminance of the first frame, FIG. 6B shows a line luminance of the second frame, and FIG. 6C shows a line luminance of the third frame.

DESCRIPTION OF THE EMBODIMENTS

The present invention will now be described in detail below with reference to the accompanying drawings showing embodiments thereof.

Figure 1:
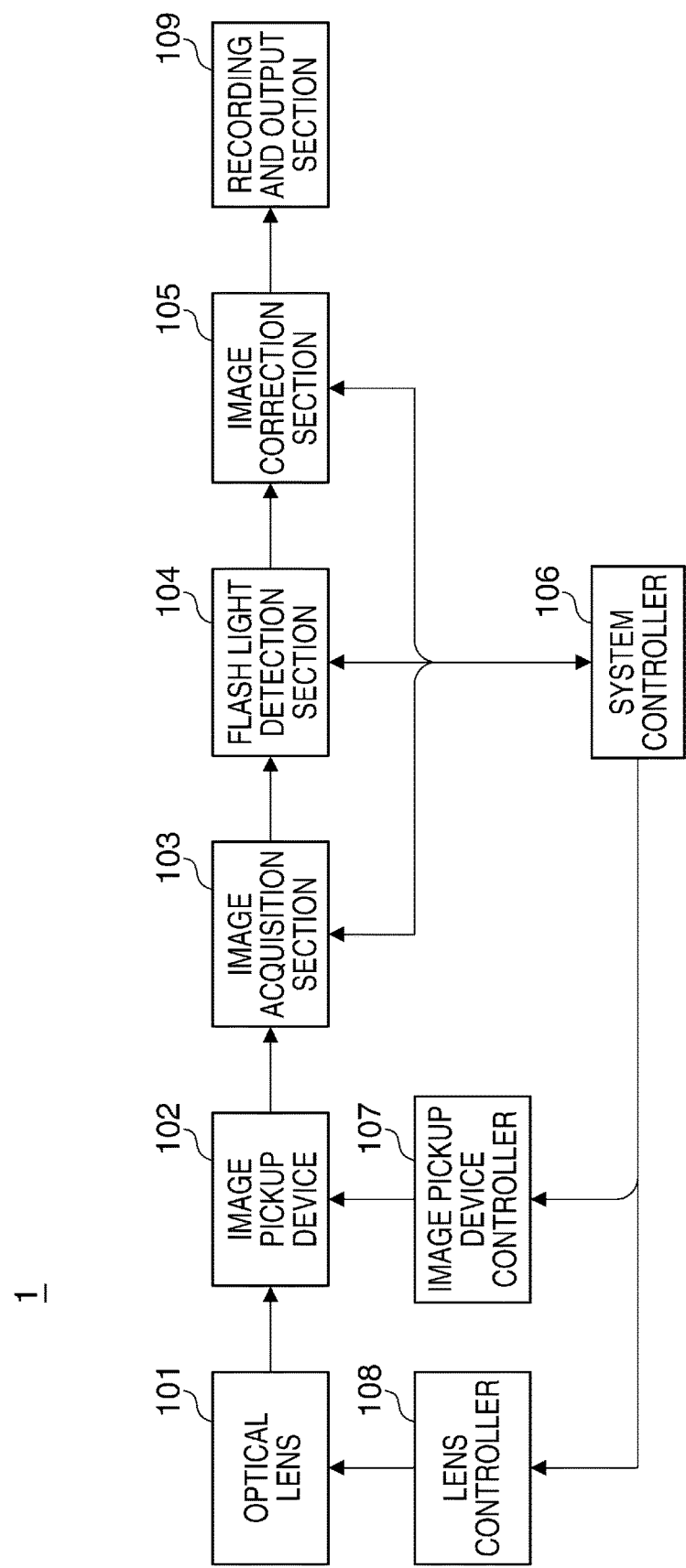
FIG. 1 is a block diagram of a digital camera as an image pickup apparatus including a flash band determination device according to a first embodiment of the present invention.
Figure 3A:
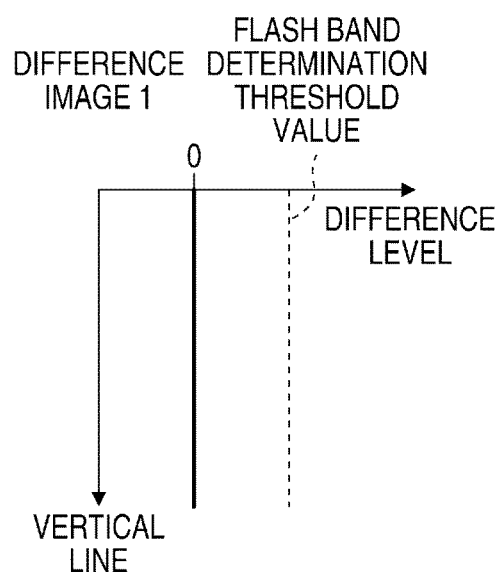
FIGS. 3A to 3D are diagrams useful in explaining a relationship between a difference level and a vertical line in a difference image, showing first to fourth difference images, respectively.
Figure 3B:
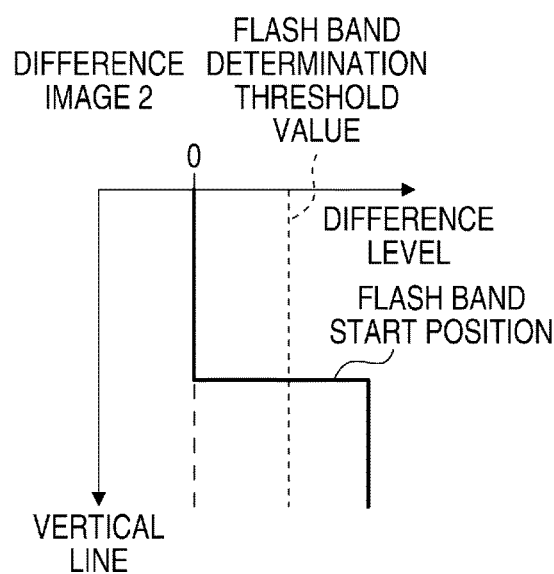
Figure 3C:
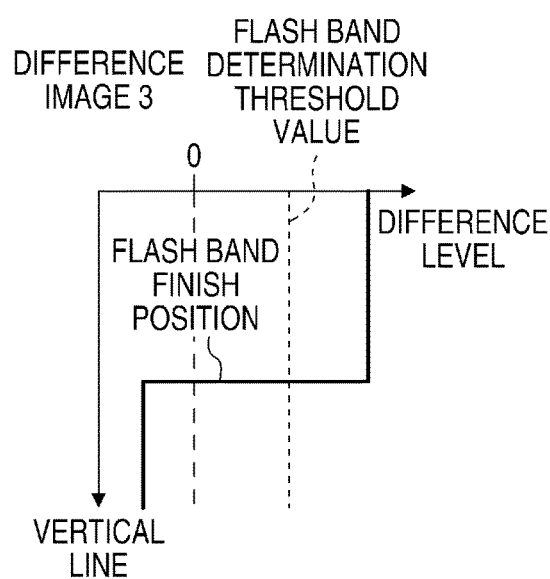
Figure 3D:
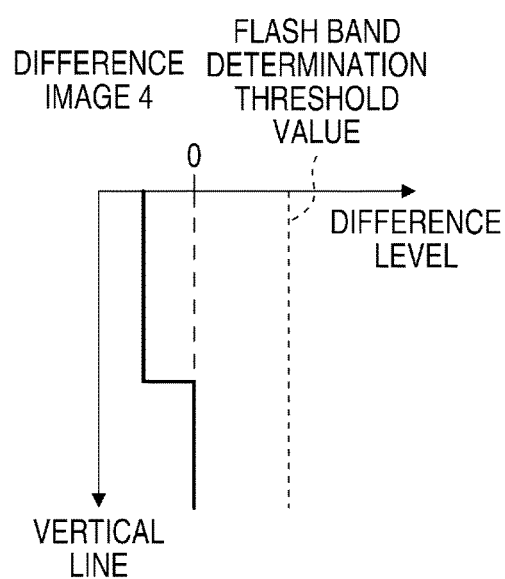

FIG. 1 is a block diagram of an image pickup apparatus including a flash band determination device according to a first embodiment of the present invention.

The illustrated image pickup apparatus is e.g. a digital camera (hereinafter simply referred to as the "camera") 1 that is capable of shooting a moving image, and has an optical lens unit (hereinafter simply referred to as the "optical lens") 101. The optical lens 101 includes a lens group, and has a focusing mechanism, a diaphragm mechanism, and a zooming mechanism. The focusing mechanism is used to adjust the focus, and the diaphragm mechanism is used to adjust the amount of light and the depth of field. Further, the zooming mechanism is used to change the focal length.

An object image (optical image) is formed on an image pickup device 102 via the optical lens 101. The image pickup device 102 outputs electrical signals (analog signals) corresponding to the optical image. Examples of the image pickup device 102 include a CCD image sensor (Charge Coupled Device) and a CMOS image sensor. In the illustrated example, the CMOS image sensor that sequentially performs read-out of pixels on a line-by-line basis is used as the image pickup device 102.

An image acquisition section 103 acquires image signals output from the image pickup device 102 as digital signals. In other words, the image acquisition section 103 includes an analog-digital front end that converts analog signals output from the image pickup device 102 to digital signals (image signals).

A flash light detection section 104 receives an output from the image acquisition section 103, and detects whether or not an external flash of light emitted e.g. from a flash or a strobe appears in an image obtained through image pickup as a flash band (i.e. whether or not there is a flash band). When a flash band is detected by the flash light detection section 104, an image correction section 105 corrects the image including a flash band (flash band image) to a full-screen flash image, as described hereinafter.

A system controller 106 controls the overall operation of the camera 1. In this control, the system controller 106 controls the camera 1 by determining how to operate the camera 1 according to a user's operation. An image pickup device controller 107 controls driving of the image pickup device 102 under the control of the system controller 106. For example, the image pickup device controller 107 performs the control including determination of a gain of the image pickup device 102 and delivery of a vertical synchronization signal VD to the image pickup device 102.

A lens controller 108 controls an aperture, focusing, zoom, ND (Neutral Density), and so forth of the optical lens 101 under the control of the system controller 106. A recording and output section 109 records corrected image signals output from the image correction section 105 in a storage medium (not shown), and outputs the image signals to a display device (not shown), such as an LCD.

Here, a description will be given of detection of a flash band, which is performed by the camera 1 shown in FIG. 1. Note that in the present example, it is assumed that moving image shooting is performed.

FIG. 2 is a diagram useful in explaining a relationship between exposure of the image pickup device appearing in FIG. 1 and output images.

Referring to FIG. 2, the horizontal axis represents a time (sec), and the vertical axis represents a vertical line indicating positions in the vertical direction of respective horizontal lines arranged in the vertical direction. Further, FIG. 2 shows a relationship between the timing of generation of an external flash of light (strobe light emission) and output images. Further, VD represents a vertical synchronization signal input to the image pickup device 102.

Now, let it be assumed that moving image shooting is performed, and as a result, frames 0 to 4 are sequentially obtained. The image pickup device controller 107 performs read-out control of the image pickup device 102 using a so-called rolling shutter method of sequentially exposing the horizontal lines, and sequentially reading out image signals on a horizontal line-by-horizontal line basis to generate one frame. Let it be assumed that in doing this, strobe light emission is performed in a time period shorter than one line time between a frame 2 and a frame 3. That is, it is assumed that strobe light emission is performed in a state in which exposure for the frame 2 is being performed on the lower part of the screen, and exposure for the next frame 3 is being performed on the upper part of the screen.

As a result, a flash band is generated in an area of the frame 2 from the intermediate portion to the lower end, and further, a flash band is generated in an area of the frame 3 from the upper end to a horizontal line substantially the same as the horizontal line corresponding to the start of the flash band in the frame 2. When detecting a flash band, a difference between the current frame and the immediately preceding frame (frame preceding by one) is obtained, and a frame in which a flash band has occurred is detected based on the difference image.

A difference image 1 (first difference image) is an image obtained by subtracting a luminance value of each pixel of the frame 0 from a luminance value of each pixel of the frame 1 (i.e. a result of subtraction in pixel value between the two images). If there is no object which is a moving object in the frame 0 and the frame 1, an integrated value of the differences of each line of all the horizontal lines (hereinafter simply referred to as the lines as well) of the difference image 1 becomes approximately equal to 0. A difference image 2 (second difference image) is an image obtained by subtracting the luminance value of each pixel of the frame 1 from a luminance value of each pixel of the frame 2. The frame 2 has a lower half part which is a flash band area in which the flash band has occurred, and the corresponding part of the frame 1 is not a flash band area, and hence in the difference image 2, an integrated value of the differences of each line in the part corresponding to the flash band area becomes large (hatched area).

A difference image 3 (third difference image) is an image obtained by subtracting the luminance value of each pixel of the frame 2 from a luminance value of each pixel of the frame 3. The frame 3 has an upper half part which is a flash band area in which the flash band has occurred, and the corresponding part of the frame 2 is not a flash band area, and hence in the difference image 3, an integrated value of the differences of each line in the part corresponding to the flash band area becomes large (hatched area). On the other hand, from a luminance value of each pixel of a lower half part of the frame 3, the luminance value of each pixel of the flash band area of the lower half part of the frame 2 is subtracted, and hence an integrated value of the differences of each line is a minus value (indicated by black). A difference image 4 (fourth difference image) is an image obtained by subtracting the luminance value of each pixel of the frame 3 from a luminance value of each pixel of the frame 4. From a luminance value of each pixel of an upper half part of the frame 4, the luminance value of each pixel of the flash band area of the frame 3 is subtracted, and hence an integrated value of the differences of each line is a minus value (indicated by black), but from a luminance value of each pixel of a lower half part of the frame 4, the luminance value of each pixel of the part of the frame 3, which is not a flash band area, is subtracted, and hence an integrated value of the differences of each line is approximately equal to 0.

FIGS. 3A to 3D are diagrams useful in explaining a relationship between a difference level and a vertical line in a difference image, showing first to fourth difference images, respectively.

Referring to FIGS. 3A to 3D, the horizontal axis represents, in the difference image, a difference level indicated by an average luminance of each line extending in the horizontal direction (hereafter referred to as "the horizontal lines") (or a line luminance which is an integrated value of the differences of each line), and the vertical axis represents a vertical line indicating positions in the vertical direction of respective horizontal lines arranged in the vertical direction. In the difference image, a threshold value (flash band determination threshold value: threshold level) for determining a flash band is set in advance. In the difference image 1 (see FIG. 3A), the difference level is approximately equal to 0 with respect to all of the horizontal lines arranged in the vertical direction. In the difference image 2 (see FIG. 3B), the difference level exceeds the flash band determination threshold value at a horizontal line where the flash band area starts.

In the difference image 3 (see FIG. 3C), the difference level crosses the flash band determination threshold value at a position substantially the same as the line at which the difference level exceeds the flash band determination threshold in the difference image 2. In the difference image 4 (see FIG. 3D), the difference level is changed from a state lower than 0 to a state equal to 0 at a position substantially the same as the line at which the difference level crosses the flash band determination threshold value in the difference image 3. In the present example, in a case where the difference level exceeds the flash band determination threshold in a difference image, indicating that at least one of two frames associated with the difference image has a flash band area, it is determined that a flash band has occurred.

Next, a description will be given of detection of a flash band in a case where a high-luminance object is constantly present.

Figure 4:
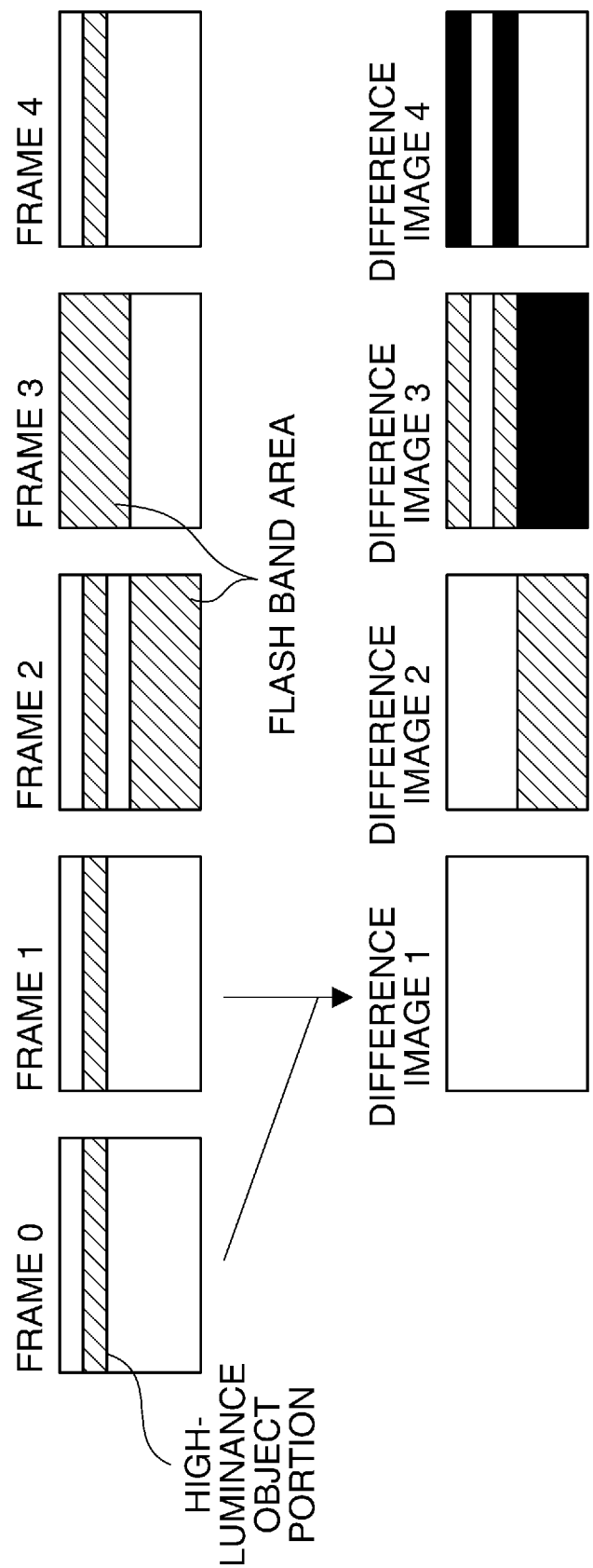
FIG. 4 is a diagram showing an example of difference images obtained when there is a high-luminance object area in each frame.

FIG. 4 is a diagram showing an example of difference images obtained when there is a high-luminance object area (high-luminance object portion) in each frame.

Referring to FIG. 4, the high-luminance object area (high-luminance area) is present in each of frames 0 to 4, and the flash band area is present in each of frames 2 and 3. In the difference image 1, the frame 0 and the frame 1 have the high-luminance object portion at substantially the same position, and hence the difference level with respect to the high-luminance object portion is equal to 0, and an integrated value of the differences of each line of all the lines of the difference image is approximately equal to 0.

Figure 5A:
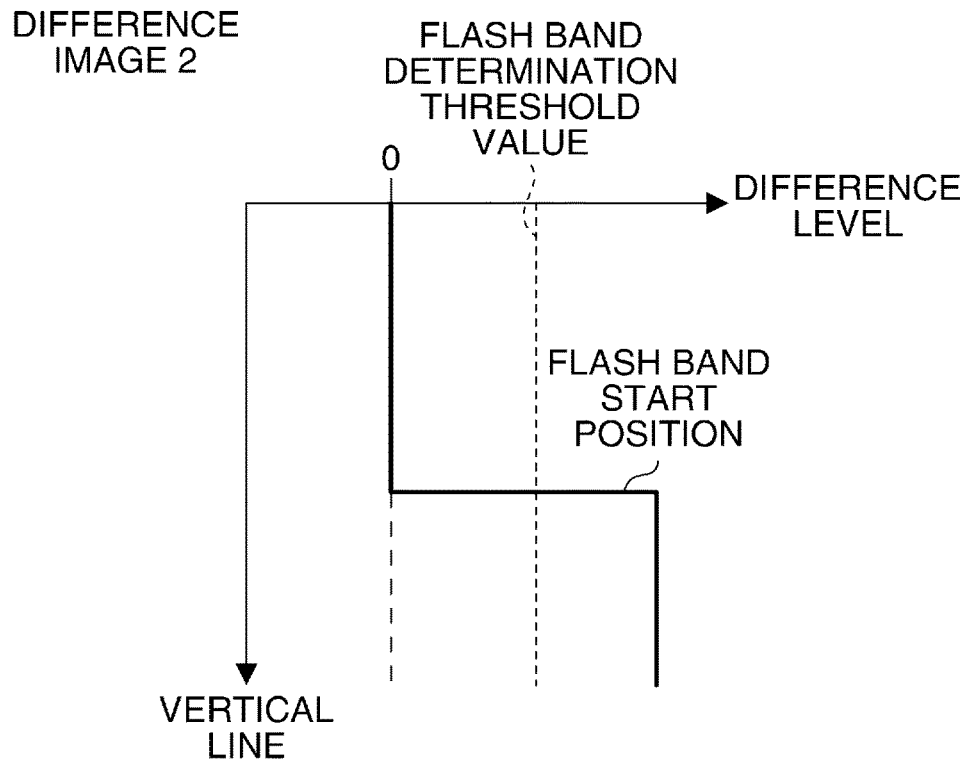
FIGS. 5A and 5B are diagrams useful in explaining a relationship between a difference level and a vertical line in a difference image obtained when a high-luminance object is constantly present in the frames in FIG. 2, showing the second and third difference images, respectively.
Figure 5B:
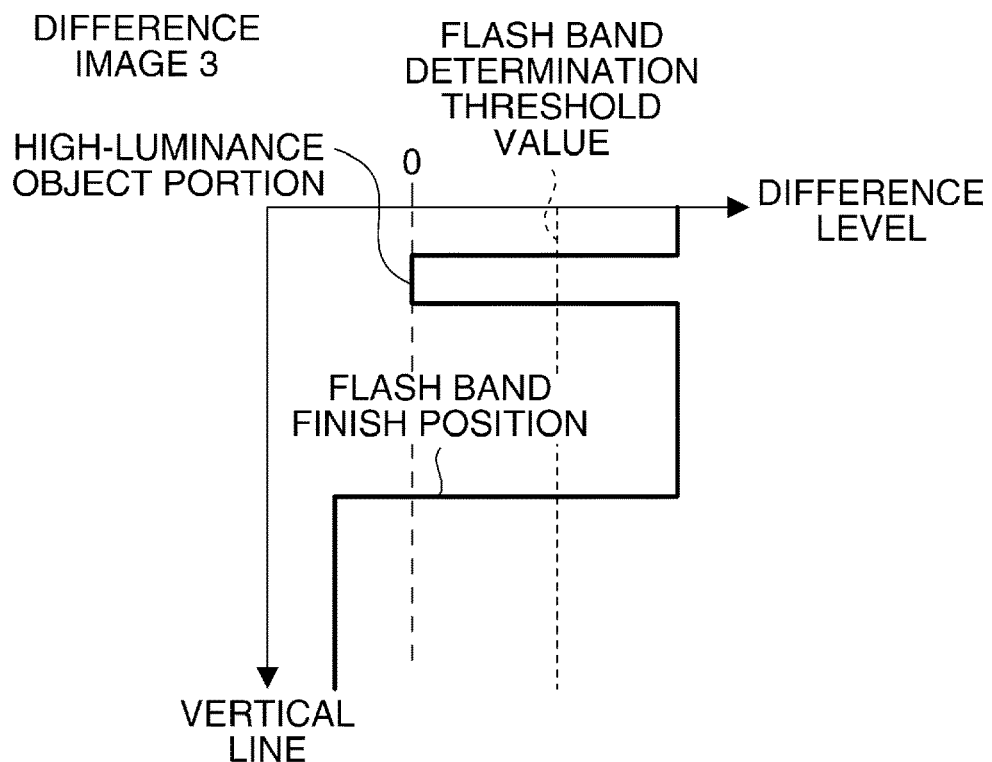

FIGS. 5A and 5B are diagrams useful in explaining a relationship between a difference level and a vertical line in a difference image obtained when a high-luminance object is constantly present in the frames in FIG. 2, showing the second and third difference images, respectively.

Referring to FIGS. 4 and 5A, similarly, in the difference image 2 as well, the difference level with respect to the high-luminance object portion is equal to 0, and the integrated value of the differences of each of lines associated with the flash band area generated in the frame 2 becomes large. In this case, it is determined that a first line at which the difference level exceeds the flash band determination threshold value set in advance indicates a flash band start position (see FIG. 5A).

In the difference image 3, the luminance value of each pixel of the high-luminance object portion is subtracted from the luminance value of each pixel of the flash band area existing in the frame 3, and further, the luminance value of each pixel of the flash band area in the frame 2 is subtracted from the luminance value of each pixel of the frame 3. At this time, if a difference in luminance between the high-luminance object portion in the frame 2 and the flash band area in the frame 3 is small, an area having a small difference is generated in part of the flash band area in the difference image 3. As shown in FIG. 5B, in the high-luminance object portion, if a difference in luminance from the flash band area is small, the difference level crosses the flash band determination threshold value at the corresponding part. This results in a state in which even when a flash band area is generated by a flash light, the flash band area is not detected as the flash band area, depending on the position of the high-luminance object portion. Note that in the difference image 4, the integrated value of the differences of each line of the part corresponding to the flash band area existing in the frame 3 becomes a minus value.

To cope with this, in the camera 1 shown in FIG. 1, the difference image is obtained in the above-described manner, and a difference level exceeding the flash band determination threshold value is detected. Further, if there is an area determined as a high-luminance object portion in a frame to be subjected to the subtraction, the area is excluded from the flash band determination.

Figure 6A:
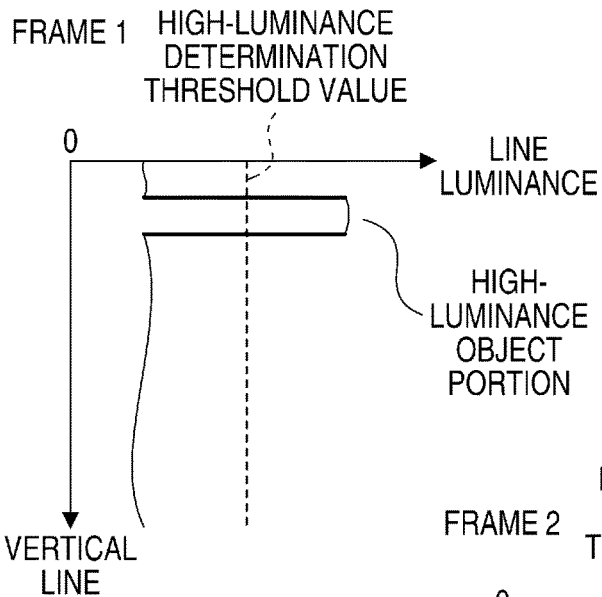
Figure 6B:
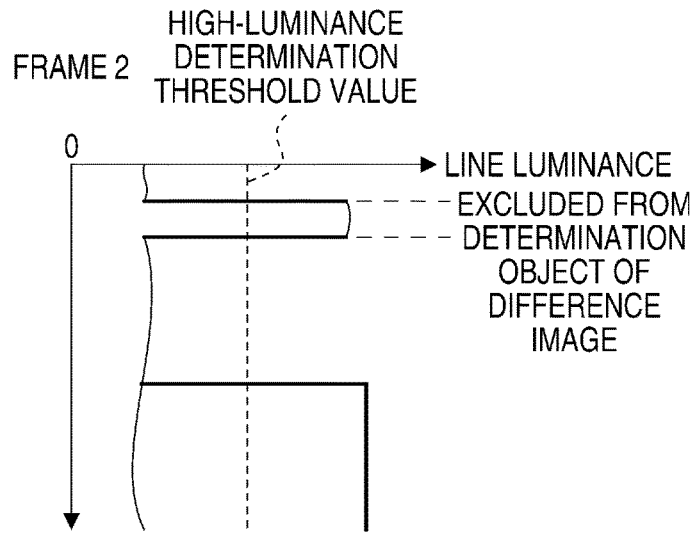
Figure 6C:
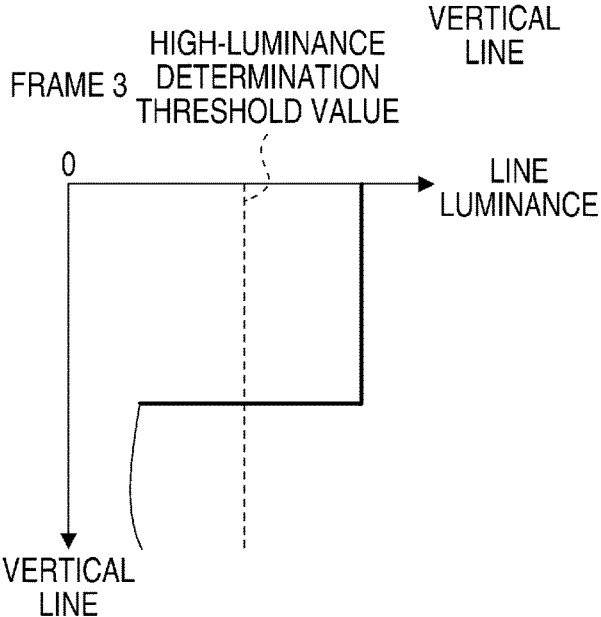

FIGS. 6A to 6C are diagrams useful in explaining a line luminance detected when there is a high-luminance object portion, in which FIG. 6A shows a line luminance of the first frame, FIG. 6B shows a line luminance of the second frame, and FIG. 6C shows a line luminance of the third frame.

Referring to FIGS. 6A to 6C, the horizontal axis represents, in each frame, an average luminance of each horizontal lines (or a line luminance which is an integrated value of the differences of each line), and the vertical axis represents a vertical line indicating positions in the vertical direction of respective horizontal lines arranged in the vertical direction. A threshold value for determining a high-luminance object on a frame basis (high-luminance determination threshold value: luminance level) is set. In a case where a high-luminance object portion is constantly present in each of frames 0 and 1 (see FIG. 6A), a line which is determined to be high in luminance in the frame 1 is excluded from the flash band determination in the difference image 2 (see FIG. 6B). Similarly, in the difference image 3, a line which is determined to be high in luminance in the frame 2 is excluded from the flash band determination (see FIG. 6C).

Figure 7:
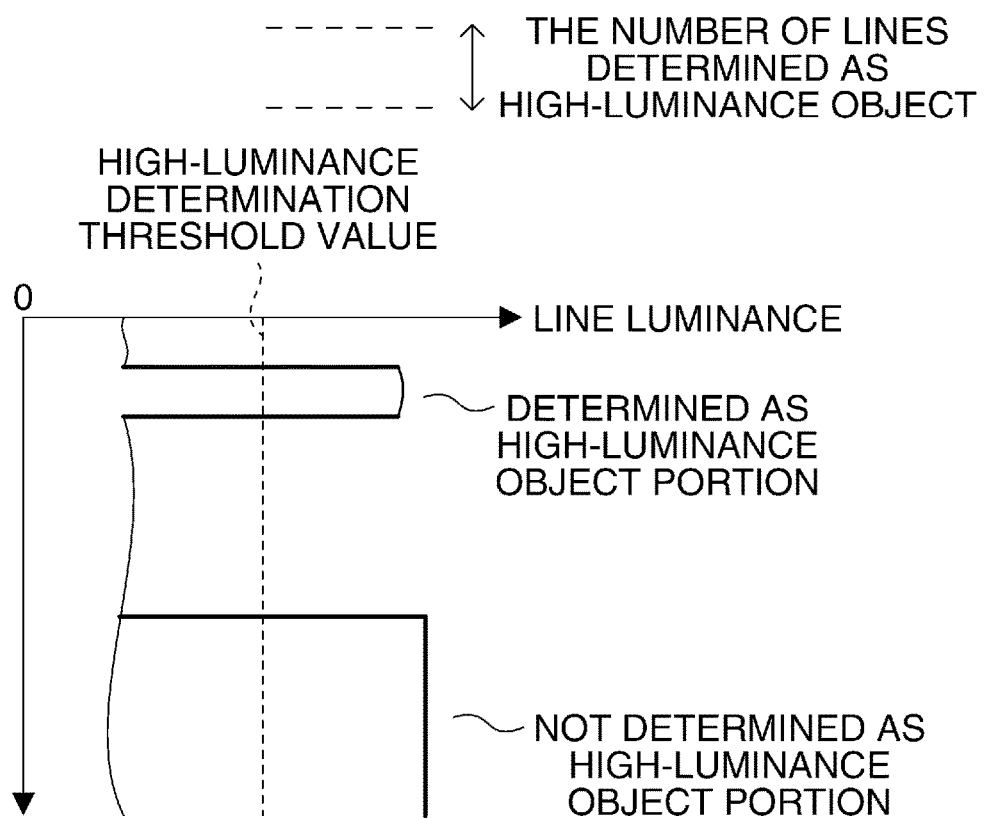
FIG. 7 is a diagram useful in explaining the number of high-luminance object lines which is used when determining a high-luminance object portion.

FIG. 7 is a diagram useful in explaining the number of high-luminance object lines which is used when determining a high-luminance object portion.

As described above, when a line which is determined to be high in luminance is excluded from the flash band determination, a line where the flash band starts is sometimes recognized as a high-luminance line. Therefore, when determining a high-luminance object portion, in addition to the high-luminance determination threshold value, the number of lines with reference to which a high-luminance object portion is determined is set as a high-luminance object determination number. Then, when the number of lines exceeding the high-luminance determination threshold value is not larger than the high-luminance object determination number, the corresponding area is determined as the high-luminance object portion.

Therefore, as shown in FIG. 7, the number of lines of an upper area exceeding the high-luminance determination threshold is not larger than the high-luminance object determination number, and hence this area is determined as the high-luminance object portion. On the other hand, the number of lines in a lower area exceeding the high-luminance determination threshold value is larger than the high-luminance object determination number, and hence this area is not determined as the high-luminance object portion. More specifically, in a case where the number of high-luminance lines vertically successive to each other is more than the high-luminance object determination number, as in the flash band area, the area of the high-luminance lines is not determined as the high-luminance object portion. As a result, even when the lines associated with the high-luminance object portion are excluded, this has no influence on detection of a flash band area in a difference image.

Figure 8A:
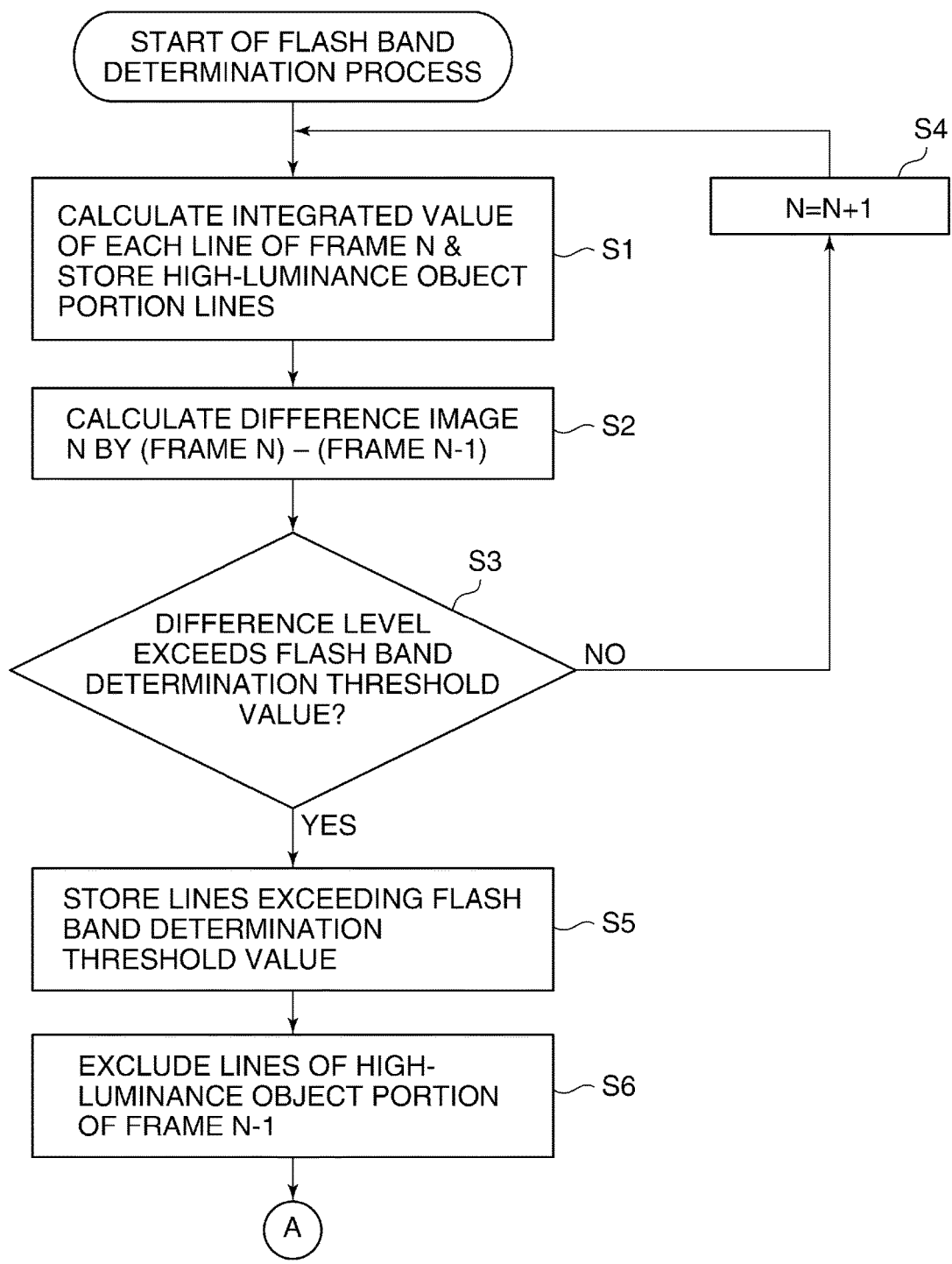
FIGS. 8A and 8B are a flowchart of a flash band determination process performed by the camera shown in FIG. 1.
Figure 8B:
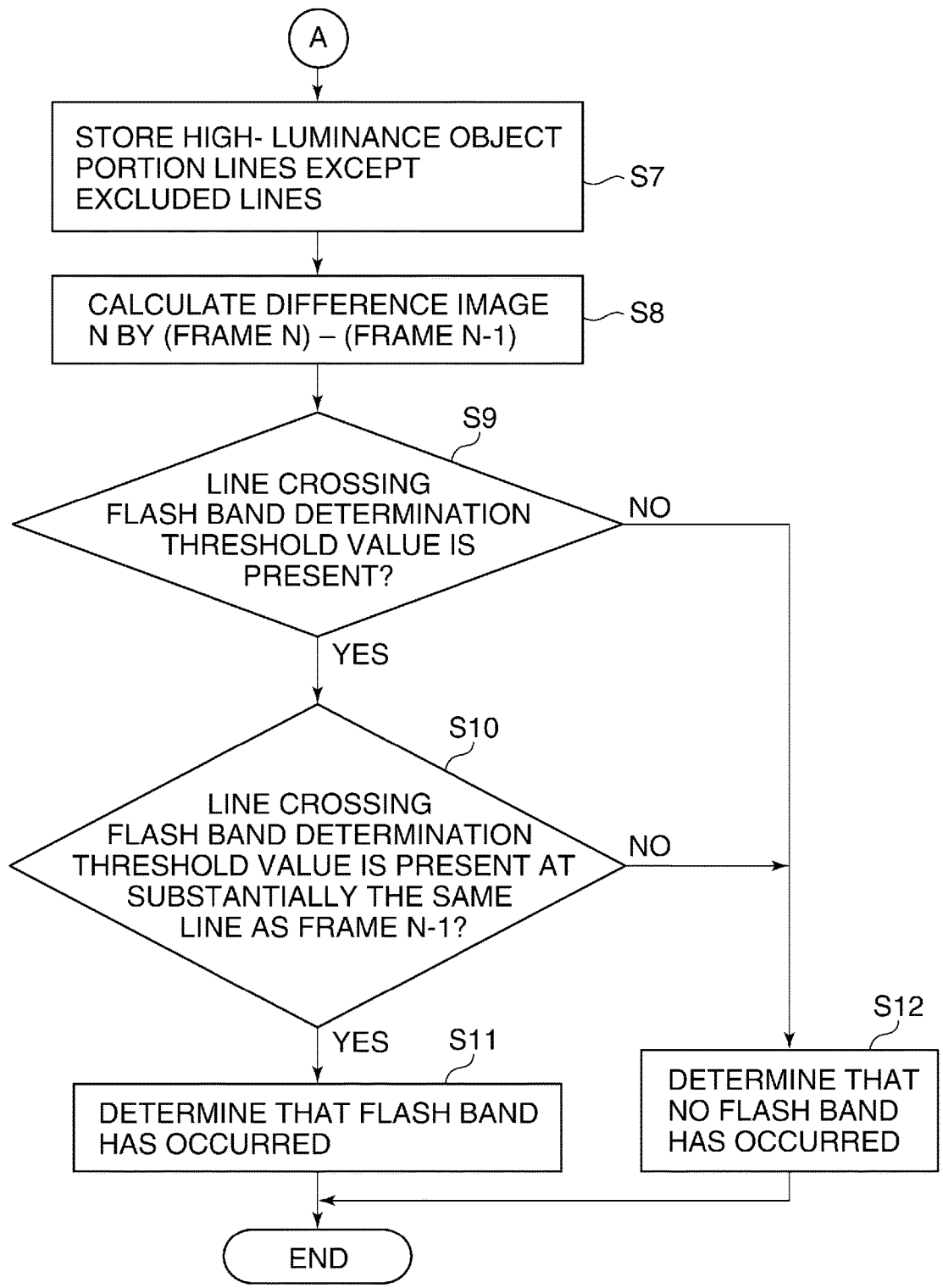

FIGS. 8A and 8B are a flowchart of a flash band determination process performed by the camera 1 shown in FIG. 1.

First, the system controller 106 calculates the integrated value of luminance values on a line-by-line basis with respect to a frame N (N is a natural number), and stores information on lines each having a larger integrated value than a predetermined high-luminance determination threshold value in an internal memory as information on high-luminance object portion lines (step S1). Then, the system controller 106 calculates a difference image N between the frame N and the immediately preceding frame (N−1) (step S2). Then, the system controller 106 causes the flash light detection section 104 to detect whether or not any line having a difference level (integrated value of the differences) exceeding the flash band determination threshold value is present in the difference image N (step S3).

If there is no line having a difference level exceeding the flash band determination threshold value (NO to the step S3), the system controller 106 sets N=N+1 (step S4), and returns to the step S1. On the other hand, if there are any lines each having a difference level exceeding the flash band determination threshold value (YES to the step S3), the system controller 106 stores the position of each line having a difference level exceeding the flash band determination threshold value, in the internal memory (step S5).

Then, the system controller 106 excludes lines determined as those of a high-luminance object portion with respect to the frame (N−1) in the above-described manner (step S6). Then, the system controller 106 excludes lines corresponding to the lines excluded with respect to the frame (N−1) from the high-luminance object portion lines stored in the step S1, and stores the resulting high-luminance object portion lines in the internal memory (step S7).

Next, the system controller 106 calculates differences with respect to all lines except the excluded lines to obtain the difference image N between the frame N and the frame (N−1) (step S8). Then, the system controller 106 determines whether or not a line having a difference level crossing the flash band determination threshold value is present in the difference image N, at substantially the same position as any of the high-luminance object lines stored in the step S7 (step S9).

If a line having a difference level crossing the flash band determination threshold value is present (YES to the step S9), the system controller 106 determines whether or not the difference level of the line crosses the flash band determination threshold value in the difference image N, at substantially the same position of a corresponding line of the frame (N−1) (step S10). If the difference level of the line crosses the flash band determination threshold value at substantially the same position as the corresponding line of the frame (N−1) (YES to the step S10), the system controller 106 determines that a flash band has occurred (step S11). Then, the system controller 106 terminates the flash band determination process.

On the other hand, if the difference level of the line does not cross the flash band determination threshold value at substantially the same position as the corresponding line of the frame (N−1) (NO to the step S10), the system controller 106 determines that a flash band has not occurred (step S12). Then, the system controller 106 terminates the flash band determination process. Note that if no line having a difference level crossing the flash band determination threshold value is present (NO to the step S9), the system controller 106 proceeds to the step S12.

As described above, in the first embodiment of the present invention, when detecting a flash band from a difference image, a high-luminance object portion is excluded from the flash band determination on a frame-by-frame basis. This makes it possible to perform the flash band detection with high accuracy.

Next, a description will be given of a digital camera as an image pickup apparatus according to a second embodiment of the present invention. Note that the digital camera as the image pickup apparatus according to the second embodiment has the same configuration as that of the camera 1 shown in FIG. 1, and hence the digital camera is similarly referred to as the camera 1.

In the first embodiment, in the difference image 2 shown in FIG. 4, lines of the high-luminance object portion existing in the frame 1 are excluded from the flash band determination, by way of example. In doing this, the high-luminance object portion existing in the frame 1 and the high-luminance object portion existing in the frame 2 are sometimes displaced in position. Therefore, the high-luminance object portion to be excluded from the flash band determination is desirable to be set to be wider than an area determined as the high-luminance object portion in the frame 1.

Figure 9:
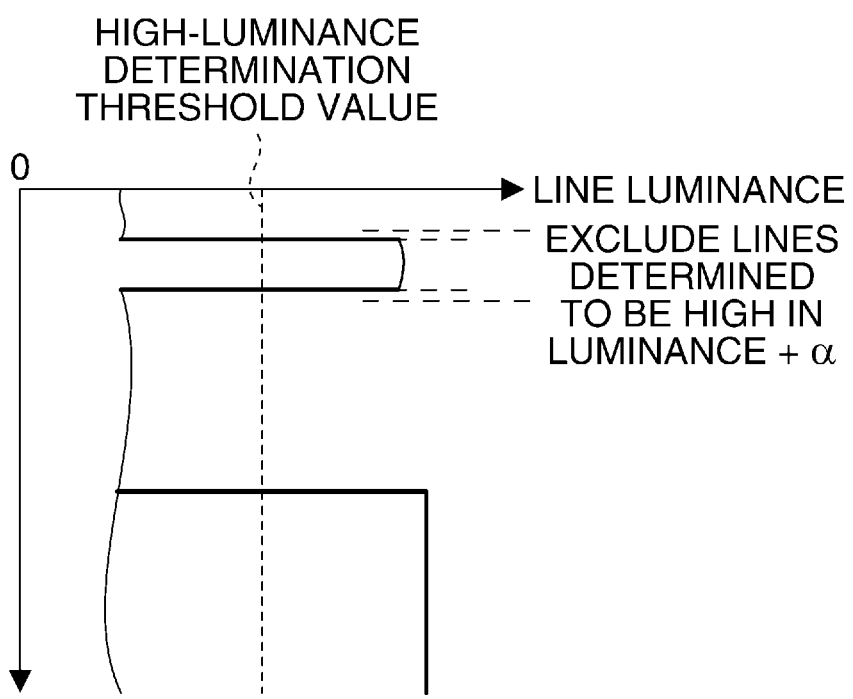
FIG. 9 is a diagram useful in explaining exclusion of lines in flash band determination performed by a digital camera as an image pickup apparatus according to a second embodiment of the present invention.

FIG. 9 is a diagram useful in explaining exclusion of lines from the flash band determination, which is performed by the camera 1 as the image pickup apparatus according to the second embodiment.

Here, the system controller 106 expands (i.e. changes) the area of the high-luminance object portion existing in the frame 1 by a predetermined number of lines (a lines) to thereby increase the number of lines of the high-luminance object portion, and excludes these lines from the flash band determination. Note that the number a is determined according to the state of the camera 1, such as an amount of camera shake of the camera 1.

As described above, in the second embodiment, an area to be excluded as the high-luminance object portion is expanded according to the state of the camera 1, such as an amount of camera shake. This makes it possible to perform the flash band detection with high accuracy.

Next, a description will be given of a digital camera as an image pickup apparatus according to a third embodiment of the present invention. Note that the digital camera as the image pickup apparatus according to the third embodiment has the same configuration as the camera 1 shown in FIG. 1, and hence the digital camera is similarly referred to as the camera 1.

Figure 10A:
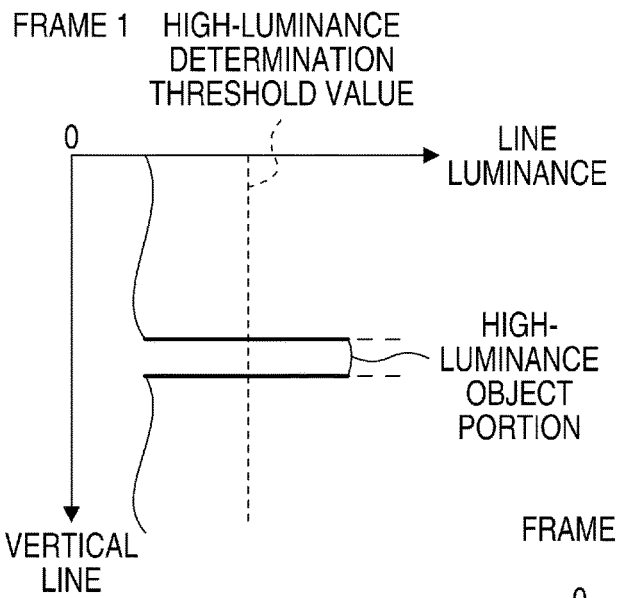
FIGS. 10A to 10C are diagrams useful in explaining a line luminance of a frame obtained by a digital camera as an image pickup apparatus according to a third embodiment of the present invention, each showing the line luminance of each frame.
Figure 10B:
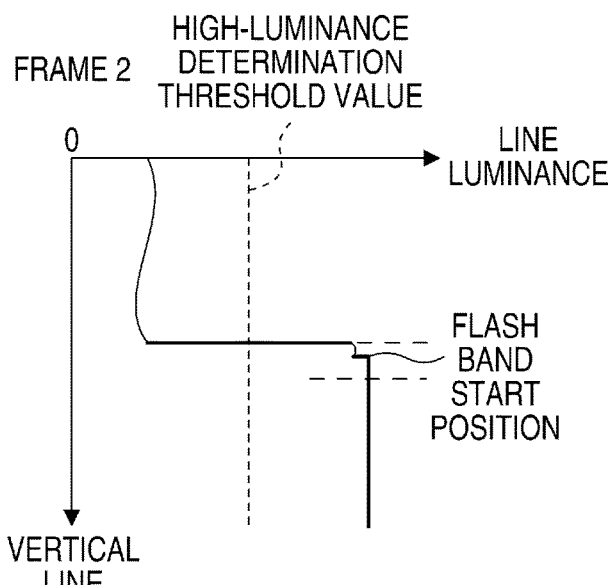
Figure 10C:
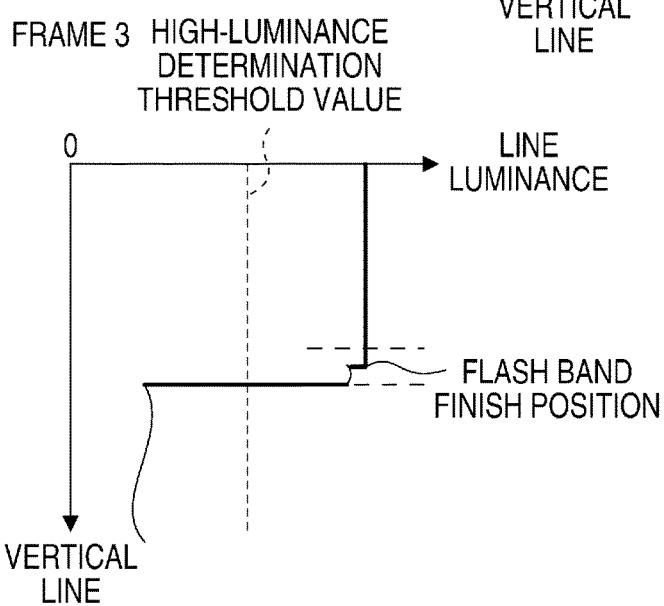
Figure 11A:
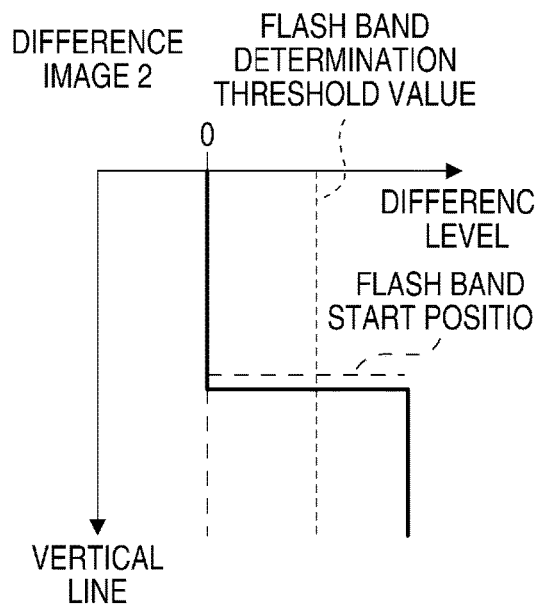
FIGS. 11A to 11C are diagrams useful in explaining the difference level of difference images obtained from the frames shown in FIGS. 10A to 10C, each showing the difference level of each difference image.
Figure 11B:
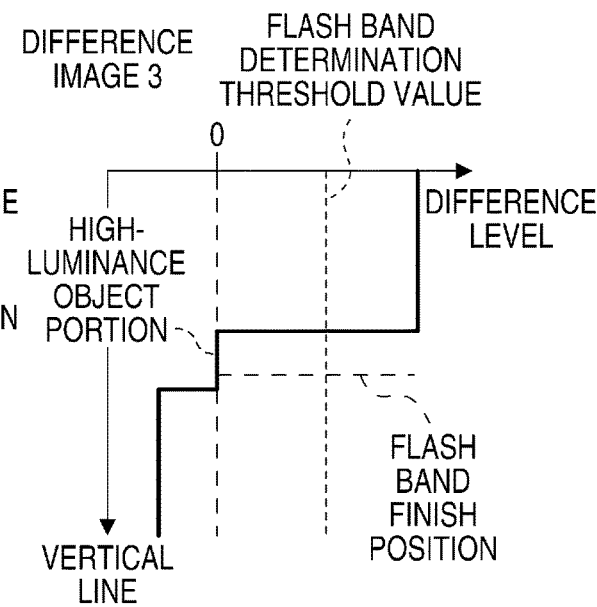
Figure 11C:
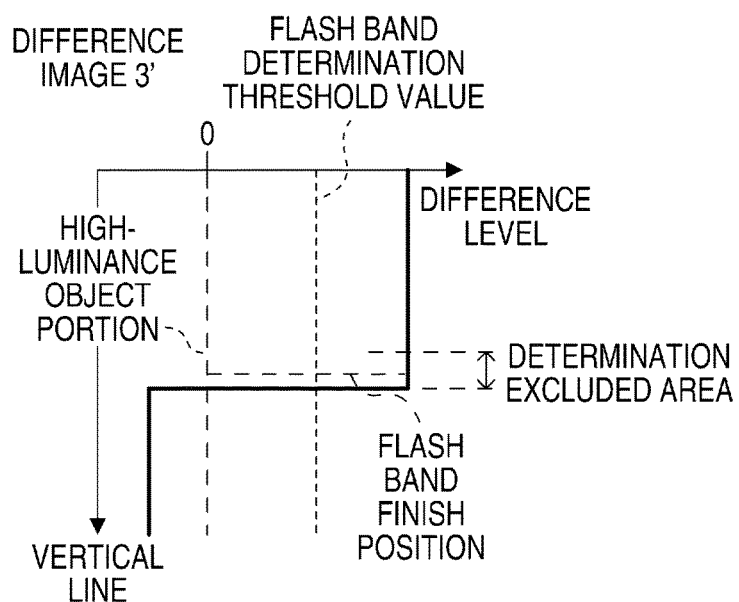

FIGS. 10A to 10C are diagrams useful in explaining a line luminance of a frame, obtained by the camera 1 as the image pickup apparatus according to the third embodiment, each showing the line luminance of each frame. Further, FIGS. 11A to 11C are diagrams useful in explaining the difference level of the difference images obtained from the frames shown in FIGS. 10A to 10C, each showing the difference level of each difference image.

FIGS. 10A to 10C, and 11A to 11C shows an example in which the high-luminance object portion existing in the frame and the flash band area at least partially overlap each other. That is, the illustrated example shows a state in which the flash band has occurred in the high-luminance object portion.

As shown in FIG. 10A, in the frame 1, lines determined as the high-luminance object portion are present. Further, as shown in FIG. 10B, in the frame 2, a flash band area starts from an intermediate portion of the high-luminance object portion. Further, as shown in FIG. 10C, in the frame 3, the flash band area ends at a position substantially the same as the flash band start position in the frame 2.

When the difference images are obtained with respect to the frames shown in FIGS. 10A to 10C, since the difference image 2 is obtained by subtracting the luminance value of each pixel of the frame 1 from the luminance value of each pixel of the frame 2, the difference level in the difference image 2 is approximately equal to 0 with respect to the lines of the high-luminance object portion in the frame 1. Further, in the difference image 2, the difference level exceeds the flash band determination threshold value at a position lower than the high-luminance object portion (see FIG. 11A).

Since the difference image 3 is obtained by subtracting the luminance value of each pixel of the frame 2 from the luminance value of each pixel of the frame 3, the difference level is approximately equal to 0 in the high-luminance object portion. Further, in the difference image 3, the difference level becomes approximately equal to 0 at a position crossing the flash band determination threshold value and corresponding to the high-luminance object portion (see FIG. 11B). When a comparison is made between the difference images 2 and 3, the position in the difference image 2 where the difference level crosses the flash band determination threshold value is different from the position in the difference image 3 where the difference level crosses the flash band determination threshold value, so that it is difficult to detect a flash band.

Therefore, the system controller 106 sets the high-luminance object portion of the frame 1 as a determination excluded area which is excluded from the flash band determination object, and determines the position where the difference level crosses the flash band determination threshold value as a position immediately after the end of the determination excluded area, as shown in the difference image 3' in FIG. 11C.

As described above, the high-luminance object portion is set as the determination excluded area, and further, the difference level immediately before the flash band determination excluded area is held in the flash band determination excluded area. This makes it possible to align the flash band start position in the difference image 2 and the flash band finish position in the difference image 3. As a result, even when there is a high-luminance object portion in the above-described state, it is possible to perform the flash band detection.

As described above, in the third embodiment of the present invention, a high-luminance object portion existing in a frame is excluded from the flash band determination.

Further, in an area excluded from the flash band determination, the difference level immediately before the area excluded from the flash band determination is held. As a consequence, even when a flash band occurs in a high-luminance object portion, it is possible to perform the flash band detection with high accuracy.

Although in the above-described embodiments, a difference image is obtained based on a difference in luminance value of each pixel between frames, a difference image may be obtained based on a difference in the integrated value of luminance values of each line between the frames.

As is clear from the above description, in the illustrated example in FIG. 1, the system controller 106 and the flash light detection section 104 function as a first determination unit and a second determination unit, and further, the flash band determination device is formed at least by the system controller 106 and the flash light detection section 104.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a control method based on the functions of the above-described embodiments may be caused to be executed by the flash band determination device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-052246 filed Mar. 16, 2016, which is hereby incorporated by reference herein in its entirety.

What is claimed is:

1. A flash band determination device that determines whether or not a flash band caused by an external flash of light is present in an image obtained through image pickup, comprising:
at least one processor;
a memory;
wherein the at least one processor is configured to function as following units by processing data stored in the memory,
a first determination unit configured to determine whether or not a high-luminance area, which is an area having a luminance level exceeding a predetermined luminance level, is present in the image; and
a second determination unit configured to determine, in a case where it is determined by said first determination unit that the high-luminance area is present when determining whether or not a flash band which is an area having a luminance level higher than a predetermined threshold level is present in a difference image which is a difference between two images which are continuously obtained, whether or not the flash band is present, by excluding an area corresponding to the high-luminance area, as a determination excluded area, from the difference image.

2. The flash band determination device according to claim 1, wherein said first determination unit determines whether or not an integrated value obtained from the image on a line-by-line basis exceeds the predetermined luminance level, and
wherein said second determination unit determines whether or not an integrated value obtained from the difference image on a line-by-line basis exceeds the predetermined threshold level.

3. The flash band determination device according to claim 2, wherein said first determination unit determines, as the high-luminance area, an area in which the number of lines each having the integrated value exceeding the predetermined luminance level is not larger than a predetermined line number.

4. The flash band determination device according to claim 3, wherein said first determination unit changes the predetermined line number according to a state of an image pickup apparatus that picks up the image.

5. The flash band determination device according to claim 4, wherein said first determination unit changes the predetermined line number according to an amount of shake of the image pickup apparatus.

6. The flash band determination device according to claim 1, wherein said second determination unit holds a luminance level immediately before the determination excluded area, in the determination excluded area.

7. An image pickup apparatus including:
at least one processor;
a memory;
wherein the at least one processor is configured to function as following units by processing data stored in the memory,
an image pickup unit configured to sequentially read and output an image corresponding to an optical image formed via an optical lens, and
a flash band determination device that determines whether or not a flash band caused by an external flash of light is present in an image obtained through image pickup, said flash band determination device comprising:
a first determination unit configured to determine whether or not a high-luminance area, which is an area having a luminance level exceeding a predetermined luminance level, is present in the image; and
a second determination unit configured to determine, in a case where it is determined by said first determination unit that the high-luminance area is present when determining whether or not a flash band which is an area having a luminance level higher than a predetermined threshold level is present in a difference image which is a difference between two images which are continuously obtained, whether or not the flash band is present, by excluding an area corresponding to the high-luminance area, as a determination excluded area, from the difference image.

8. A method of controlling a flash band determination device that determines whether or not a flash band caused by an external flash of light is present in an image obtained through image pickup, comprising:

determining whether or not a high-luminance area, which is an area having a luminance level exceeding a predetermined luminance level, is present in the image; and determining, in a case where it is determined that the high-luminance area is present when determining whether or not a flash band which is an area having a luminance level higher than a predetermined threshold level is present in a difference image which is a difference between two images which are continuously obtained, whether or not the flash band is present, by excluding an area corresponding to the high-luminance area, as a determination excluded area, from the difference image.

9. A non-transitory computer-readable storage medium storing a computer-executable program for executing a method of controlling a flash band determination device that determines whether or not a flash band caused by an external flash of light is present in an image obtained through image pickup, wherein the method comprises:

determining whether or not a high-luminance area, which is an area having a luminance level exceeding a predetermined luminance level, is present in the image; and determining, in a case where it is determined that the high-luminance area is present when determining whether or not a flash band which is an area having a luminance level higher than a predetermined threshold level is present in a difference image which is a difference between two images which are continuously obtained, whether or not the flash band is present, by excluding an area corresponding to the high-luminance area, as a determination excluded area, from the difference image.

* * * * *